United States Patent
Reznik et al.

(10) Patent No.: US 7,583,720 B2
(45) Date of Patent: Sep. 1, 2009

(54) WIRELESS COMMUNICATION METHOD AND APPARATUS FOR ASSIGNING MULTI-PATHS TO RAKE RECEIVER FINGERS

(75) Inventors: Alexander Reznik, Titusville, NJ (US); Yogendra Shah, Devon, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 605 days.

(21) Appl. No.: 10/798,707

(22) Filed: Mar. 11, 2004

(65) Prior Publication Data

US 2004/0240532 A1 Dec. 2, 2004

Related U.S. Application Data

(60) Provisional application No. 60/455,017, filed on Mar. 13, 2003.

(51) Int. Cl.
*H04B 1/00* (2006.01)
(52) U.S. Cl. .................. 375/144; 375/130; 375/142; 375/148; 375/149; 375/316; 375/354; 375/147; 370/335; 370/342; 370/441
(58) Field of Classification Search ................ 375/144, 375/130, 142, 147, 148, 149, 316, 347, 354; 455/65, 277.1, 277.2; 370/335, 342, 441, 370/320
See application file for complete search history.

(56) References Cited

U.S. PATENT DOCUMENTS

| | | | |
|---|---|---|---|
| 6,377,614 B1 | 4/2002 | Yamashita | |
| 6,532,222 B1 * | 3/2003 | Rege et al. | 370/335 |
| 6,725,016 B1 * | 4/2004 | Jeong et al. | 455/65 |
| 6,975,670 B1 * | 12/2005 | Aldaz et al. | 375/144 |
| 2001/0034233 A1 | 10/2001 | Tiedemann et al. | |
| 2002/0094018 A1 | 7/2002 | Terao | |
| 2003/0142732 A1 * | 7/2003 | Moshavi et al. | 375/148 |

FOREIGN PATENT DOCUMENTS

| | | |
|---|---|---|
| JP | 2001-308744 | 11/2001 |
| JP | 2002-026767 | 1/2002 |

(Continued)

OTHER PUBLICATIONS

R.G. Gallagher "Discrete Stochastic Processes", Kluwer Academic Publishers, Boston, MA, 1996, pp. 227-239.

(Continued)

*Primary Examiner*—David C Payne
*Assistant Examiner*—Leila Malek
(74) *Attorney, Agent, or Firm*—Volpe and Koenig, P.C.

(57) ABSTRACT

A wireless communication method and system for assigning multi-paths to Rake receiver fingers. A Rake finger assignment database is established in which multi-path signals are categorized into a verified group and an unverified group. Each multi-path is assigned to an individual bin in the database. Each bin includes a pilot phase data field, an antenna data field, a code data field, an averaged signal strength data field, an assigned flag data field, a verification flag data field, an update flag data field, an assigned Rake finger number data field and an assignment time counter data field. The multi-path signals in the verified group are further categorized into an assigned subgroup and an unassigned subgroup. During a measurement interval, each of a plurality of newly measured multi-path signals is compared to the multi-path signals in the database and is processed accordingly.

10 Claims, 5 Drawing Sheets

FOREIGN PATENT DOCUMENTS

| | | |
|---|---|---|
| JP | 2002-232324 | 8/2002 |
| JP | 2002-280932 | 9/2002 |
| WO | 01/45295 | 6/2001 |

OTHER PUBLICATIONS

3$^{rd}$ Generation Partnership Project; Technical Specification Group Radio Access Network; Physical channels and mapping of transport channels onto physical channels (FDD), (Release 5), 3GPP TS 25.211 V5.3.0, (Dec. 2002).

3$^{rd}$ Generation Partnership Project; Technical Specification Group Radio Access Network; Physical channels and mapping of transport channels onto physical channels (FDD), (Release 6), 3GPP TS 25.211 V6.0.0, (Dec. 2003).

* cited by examiner

RAKE FINGER ASSIGNMENT DATABASE

| MULTI-PATHS | PILOT PHASE | ANTENNA | CODE | AVERAGED SIGNAL STRENGTH | ASSIGNED FLAG | VERIFIED FLAG | UPDATE FLAG | ARFN | ATC |
|---|---|---|---|---|---|---|---|---|---|
| BIN 1 | | | | | | | | | |
| BIN 2 | | | | | | | | | |
| ⋯ | | | | | | | | | |
| BIN N | | | | | | | | | |

FIG. 3

WIRELESS COMMUNICATION METHOD AND APPARATUS FOR ASSIGNING MULTI-PATHS TO RAKE RECEIVER FINGERS

CROSS REFERENCE TO RELATED APPLICATION(S)

This application claims priority from U.S. provisional application No. 60/455,017 filed on Mar. 13, 2003, which is incorporated by reference as if fully set forth.

FIELD OF INVENTION

The present invention relates generally to Rake receiver architecture. More particularly, the present invention relates to the assignment of pilot multi-paths to the fingers of a Rake receiver.

BACKGROUND

In a conventional third generation (3G) wideband code division multiple access (W-CDMA) system, one or more digital signal processor (DSP) based Rake receivers are used to minimize distortion of signals when communicating between a base station (BS) and a plurality of wireless transmit/receive units (WTRUs). A search for multi-paths in such a W-CDMA system is performed to improve reception characteristics by insuring that a desired power level is maintained.

In a Rake receiver where a plurality of Rake fingers are used, it is necessary to quickly and reliably find new multi-paths to promote a low false alarm/high detection probability under a variety of fading conditions. For any given WTRU, it is desired to assign the best multi-paths to the Rake receiver fingers at any given moment in time based on established priorities. Measurement tolerances and errors, particularly with regard to phase, must be taken into consideration.

It is desirable to implement a Rake receiver finger assignment (FA) and multi-path search process that is more efficient and requires fewer resources than those used in conventional systems.

SUMMARY

In accordance with the present invention, a wireless communication method and system assigns multi-paths to Rake receiver fingers. A Rake finger assignment database is established in which multi-path signals are categorized into a verified group and an unverified group. The verified group includes multi-path signals that were detected more than once and the unverified group includes multi-path signals that are not detected more than once. The multi-path signals in the verified group are further categorized into an assigned subgroup and an unassigned subgroup. Each of the multi-path signals in the assigned subgroup is assigned to a Rake receiver finger and each of the multi-path signals in the unassigned subgroup is not assigned to a Rake receiver finger.

During a measurement interval, each of a plurality of newly measured multi-path signals may be compared to the multi-path signals in the database. If a newly measured multi-path signal is not found in the database, the newly measured multi-path signal may be added to the database.

Each multi-path signal may be assigned a respective bin in the database. The bin may include a data structure including a verification flag data field, which may be set such that it indicates that the multi-path signal is not verified. If a multi-path signal in the database, that belongs to the unassigned subgroup, matches a newly measured multi-path signal, the verification flag data field may be set such that it indicates that the multi-path signal is verified.

Each bin of the database may include a pilot phase data field, an antenna data field, a code data field, an averaged signal strength data field, an assigned flag data field, a verification flag data field, an update flag data field, an assigned Rake finger number data field and an assignment time counter data field.

BRIEF DESCRIPTION OF THE DRAWING(S)

A more detailed understanding of the invention may be had from the following description of a preferred example, given by way of example and to be understood in conjunction with the accompanying drawing wherein:

FIG. 3 is an exemplary Rake finger assignment database configuration for categorizing and processing scanned pilot multi-paths in accordance with one embodiment of the present invention;

Figure 4A:
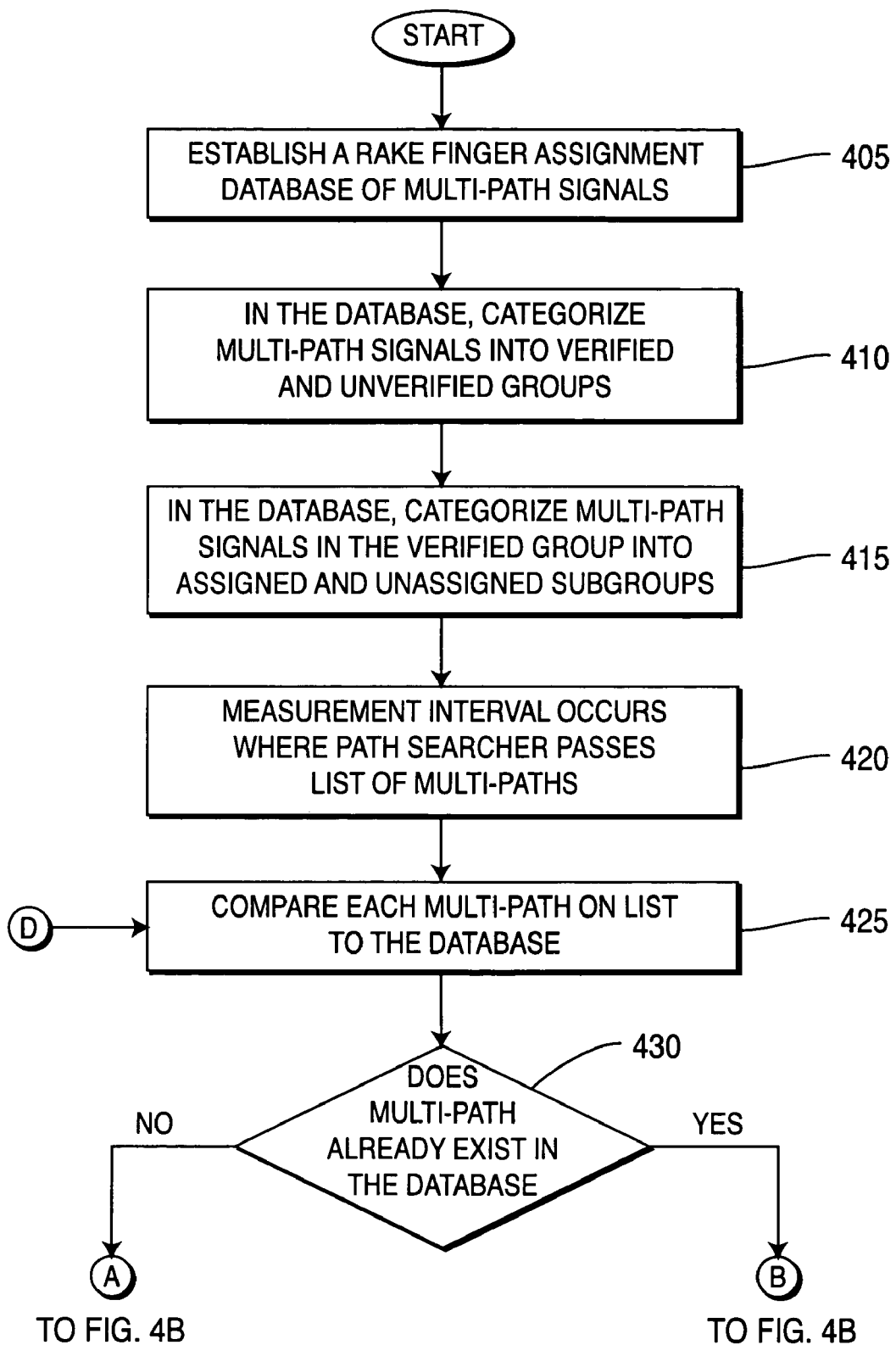
Figure 4B:
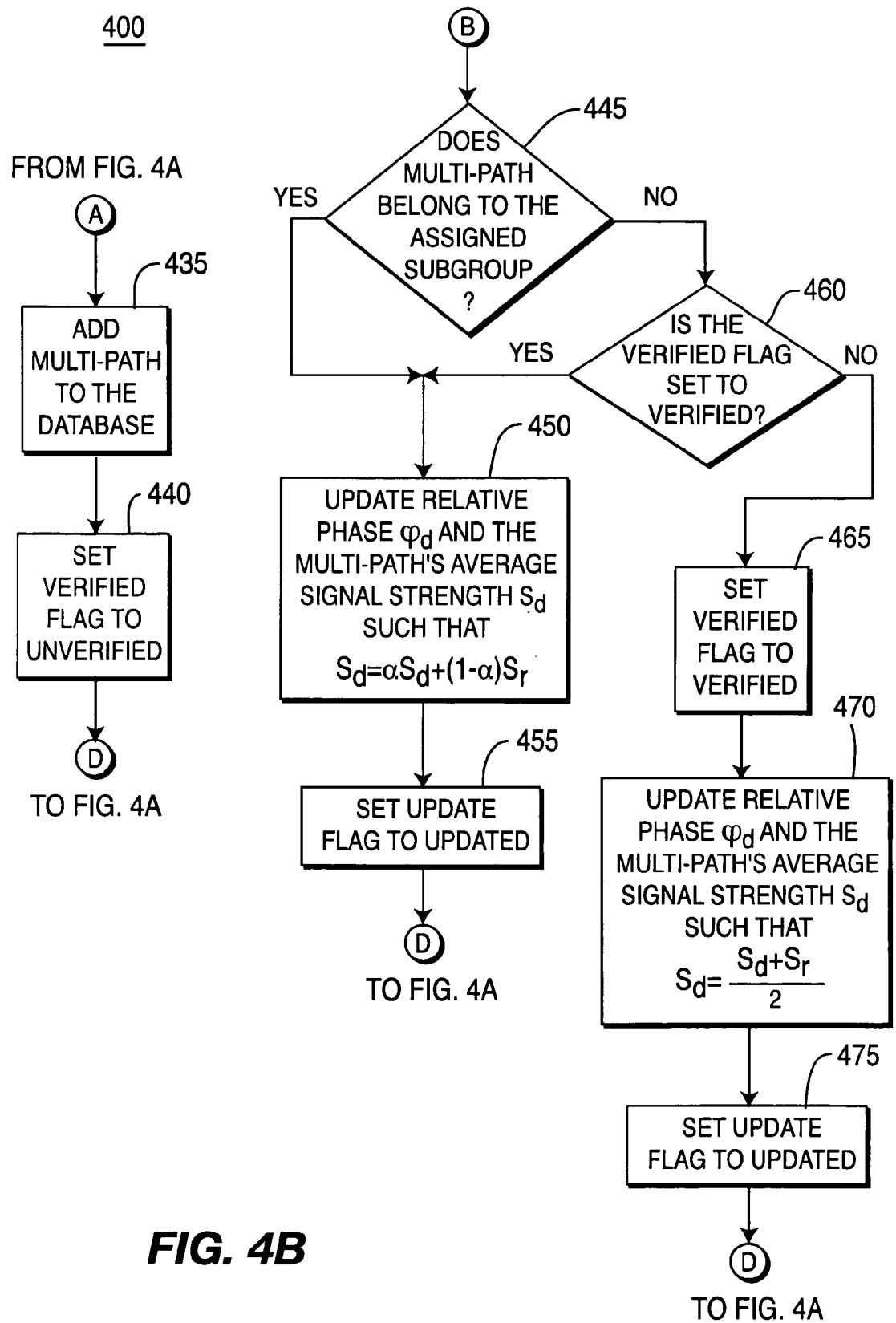
Figure 5:
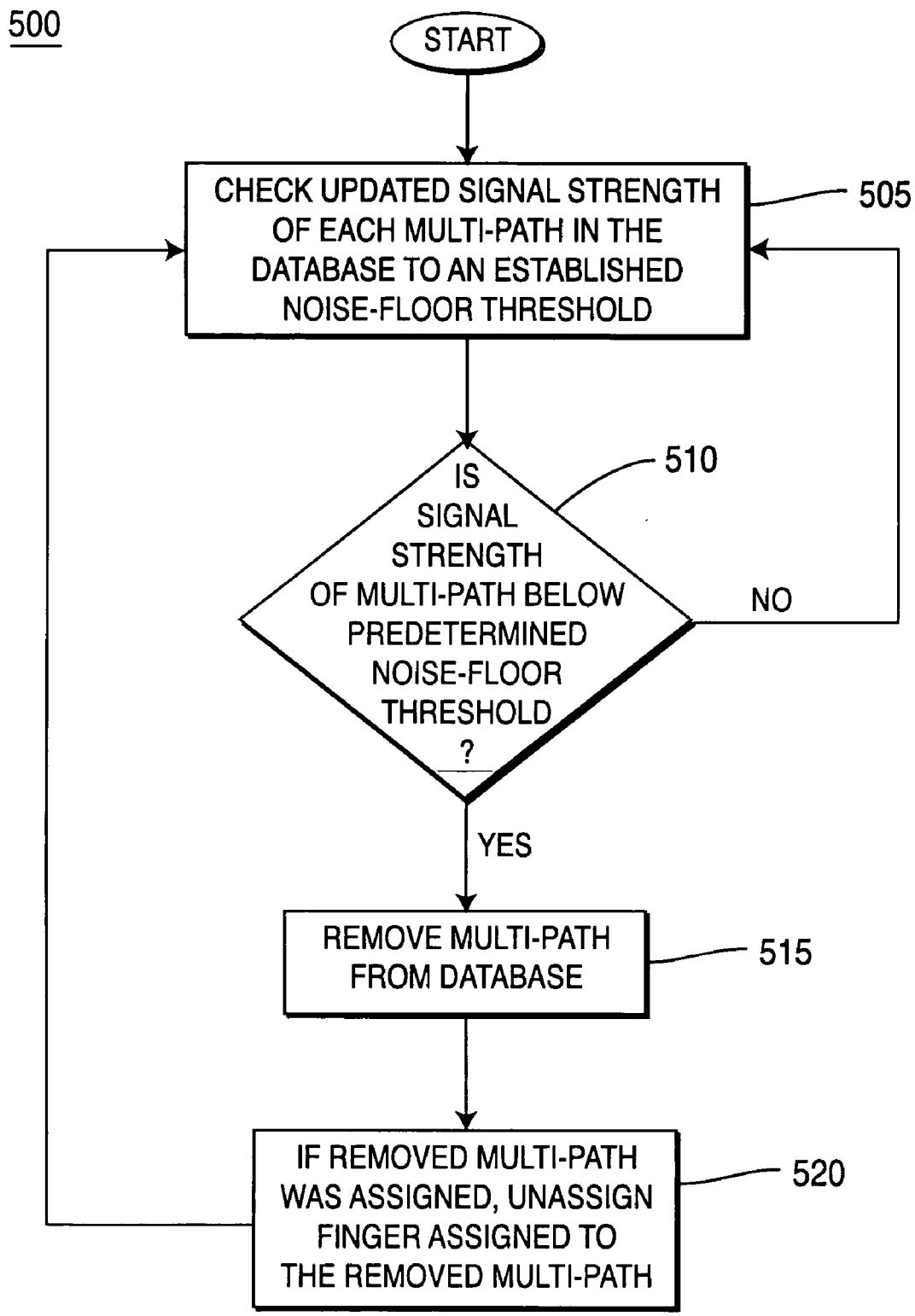

FIGS. 4A and 4B, taken together, are a flowchart of a process for maintaining the database of FIG. 3 on a real-time basis; and FIG. 5 is a flow chart including method steps used to control the size of the exemplary Rake finger assignment database of FIG. 3.

DETAILED DESCRIPTION OF THE PREFERRED EMBODIMENT(S)

The present invention provides a strategy for resource management of a Rake finger pool and implementing a multi-path search for a flexible Rake receiver structure. By way of example, the present invention can be used for a W-CDMA base-station receiver application-specific integrated circuit (ASIC) node B processor (NBP), as applied to layer 1 in a frequency division duplex (FDD) scenario. An FDD NBP includes a hardware path searcher (PS) interfacing with a microcontroller unit (MCU). The invention provides a method of implementation of finger assignment and the path position determination (PPD) in the MCU.

A wireless transmit/receive unit ("WTRU") includes but is not limited to a user equipment, mobile station, fixed or mobile subscriber unit, pager, or any other type of device capable of operating in a wireless environment. A "base station" includes but is not limited to a base station, Node B, site controller, access point or other interfacing device in a wireless environment.

Figure 1:
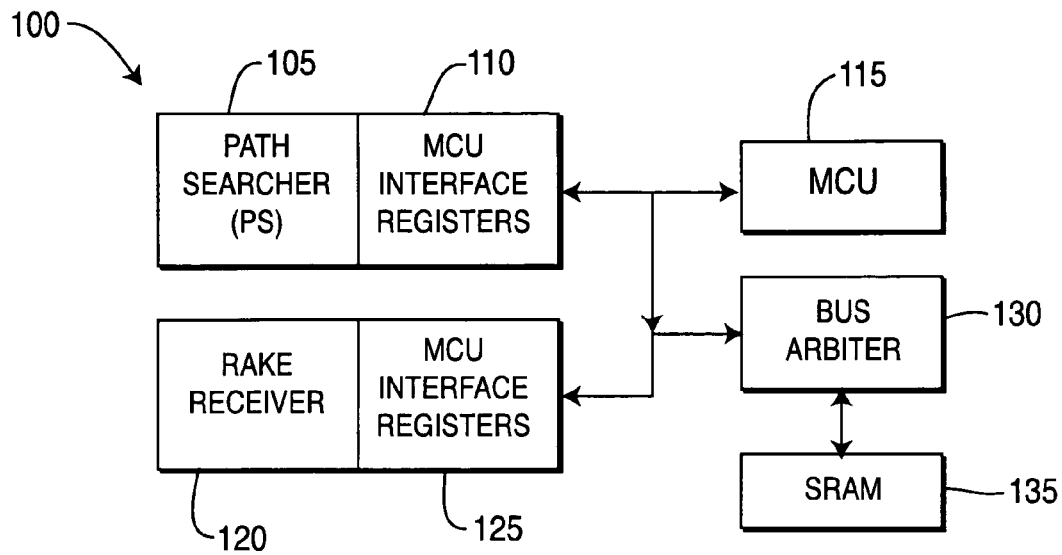
FIG. 1 is a block diagram of a W-CDMA system having a Rake finger assignment architecture in accordance with one embodiment of the present invention.

FIG. 1 is a block diagram of W-CDMA system 100 having an ASIC finger assignment architecture constructed in accordance with the present invention. The W-CDMA system 100 includes a PS 105, a first set of MCU interface registers 110, an MCU 115, a Rake receiver 120, a second set of MCU interface registers 125, a bus arbiter 130, and a shared random access memory (SRAM) 135.

The FDD NBP includes the PS 105, which is preferably implemented in hardware, interfacing with the MCU 115 through the MCU interface registers 110. The PS 105 receives its instructions from the SRAM 135 and is directed by the MCU 115. In order to provide a flexible and ultimately optimized solution for the finger assignment, the final stages of the Rake finger assignment processes, are implemented in the MCU 115.

The W-CDMA FDD standard requires the BS to maintain synchronization with all WTRUs through active management of received multi-paths from the WTRUs. The objective of the finger assignment algorithm is to allow optimum demodulation in the BS through diversity combining of the best multi-paths at any given moment in time and to detect the loss of a pilot or the availability of a strong new pilot with high reliability, ensuring low false alarm probability and high detection probability.

In order to perform this task efficiently, the FDD NBP has at its disposal a PS, which performs the detection of pilot multi-paths by searching within a specified search window, which is wide enough to cover the expected path delays. The FDD NBP utilizes a flexible vector correlator (VC) based PS.

One problem encountered in abstracting away the receiver functionality relates to the final decision on whether a multi-path exists in a specific location on the code-phase plane for a particular code-antenna combination. An additional matter of concern is the problem of whether a path, if it exists, should be assigned to a Rake receiver finger. For this purpose, it is considered that a Rake receiver finger is a signal processing resource capable of processing a single path from a single antenna and code combination. There is a finite pool of such resources, which have to be managed such that assignment of resources between WTRUs in the cell is done in the most efficient manner.

Figure 2:
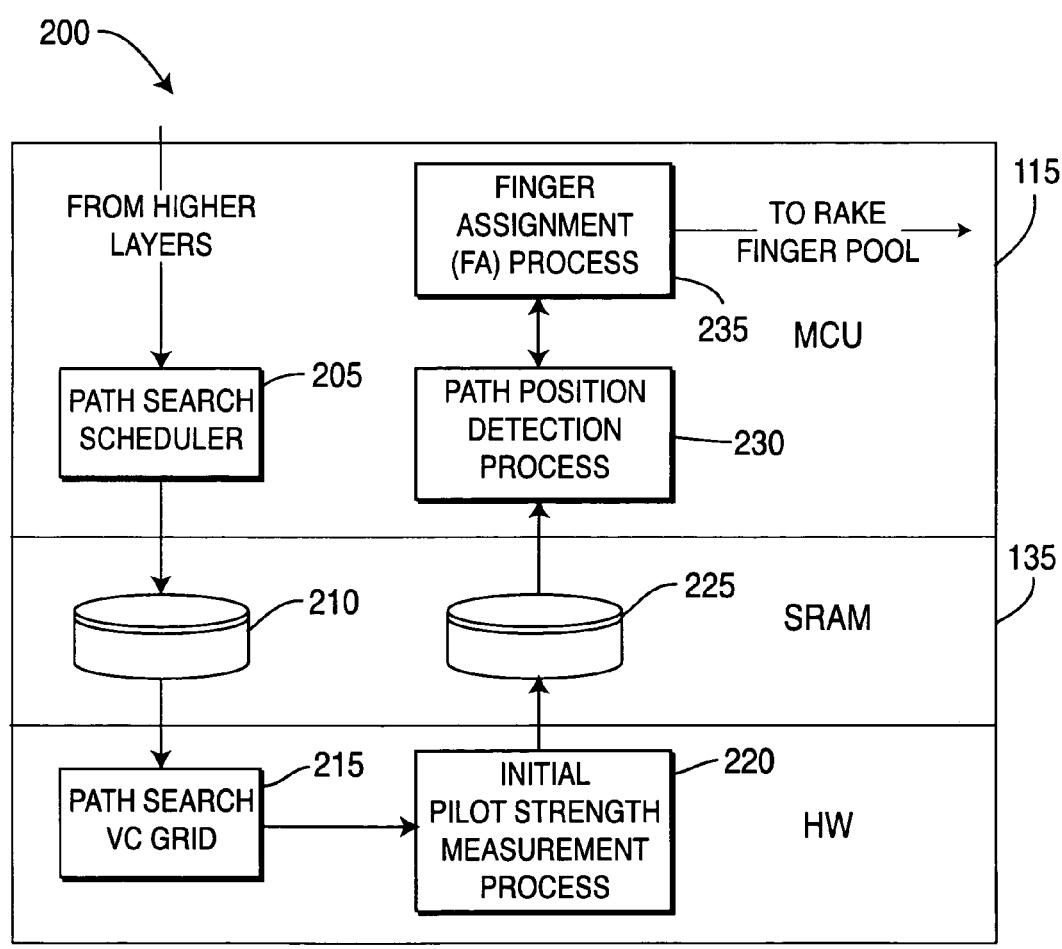
FIG. 2 is a flow diagram illustrating a process of assigning multi-paths to Rake fingers in accordance with one embodiment of the present invention.

FIG. 2 is a flow diagram showing a process 200 of assigning pilot multi-path signals to Rake receiver fingers using software and/or hardware for implementation. A path search scheduler 205 receives signals from higher layers and provides scheduling data to a first portion 210 of SRAM 135. The data from the first portion 210 of SRAM 135 is received by a path search VC grid 215 which provides an output which is evaluated as an initial pilot strength measurement (PSM) process 220. The results of the PSM process 220 are stored in a second portion 225 of the SRAM 135 and are provided to the MCU 115 for processing by path position detection process 230. A finger assignment (FA) process 235 correlates with the path position detection and provides an assignment output to the Rake finger pool.

As shown in FIG. 2, the interface between the PS scheduler 205 and the SRAM 135 is used on a fastest frame basis. The interface between the SRAM 135 and the PS VC grid 215 is used to read the schedule. It can either be used on a slot-by-slot basis to read the configuration for that slot, or the whole schedule may be read at once and pre-stored inside the hardware. The interface between the PSM process 220 and the SRAM 135 is used at the slot rate or any other rate which provides data in a timely fashion. The interface between the SRAM 135 and the PPD 230 enables all the data written by the initial PSM process 220 during a frame to be read within 1 frame. However, the real-time requirement does not need to be tied to a slot clock.

The objective of the PS scheduler 205 is to ensure that the PS is fully occupied searching for pilot multi-paths. The scheduler 205 schedules the WTRU antenna and code search list for the PS to measure. It must ensure that the PS is never idle by ensuring that the search list is always full. The search list is created from the WTRU search set. While it is anticipated that the actual codes and antennas searched by the path searcher hardware 105 will change on a slot-by-slot basis, the search schedule itself should change only when one or more radio links change. Thus, any updates to the schedule can occur to the frame boundary. Moreover, since search schedule updates are typically caused by changes in system configuration, these are likely to be significantly slower.

The rate of search for any particular pilot depends on the total number of pilots that need to be searched. The PS is designed to include a sufficient amount of search HW so that a minimally required Quality of Services (QoS) is supported when the system is loaded with the maximum supported number of WTRUs. When the system is not maximally loaded by WTRUs, the WTRUs receive a better search QoS then the minimal required. Because scheduling is controlled by the MCU, it is also possible to assign certain WTRUs a better search schedule, resulting in better QoS. The selection criteria can be based on various factors, including, but not limited to, preferences given by the operator to certain users.

The function of the process 200 is to ensure that all WTRUs in the WTRU set are measured for their received multi-path phase and strength. Any multi-paths found are verified to ensure reliability of the data and reported to the finger assignment algorithm. Verification is performed by filtering the received signal, of the observed multi-path over time, and passing a minimum signal strength threshold.

Upon receiving the results for a search from the PS 105, the multi-paths are categorized in a Rake finger assignment database with respect to a current set of multi-paths. The categorization with respect to the current set of multi-paths is performed starting from a WTRU multi-path set known by the BS. The categorization process involves distinguishing if a new multi-path matches an existing multi-path in the Rake finger assignment database. If the multi-path already exists, its signal strength and phase estimates are updated. If it is a new multi-path, it is added to the Rake finger assignment database for further signal processing.

The initial process requires that all VC Grid outputs be examined for the current slot. For each WTRU-antenna combination, the top candidates are identified and written into the SRAM 135, while the rest of the measurements are discarded. The goal is to limit the load on the interface to SRAM and from the SRAM 135 to the PPD 230 with a negligible effect on the probability of missing relevant measurements. The process 200 is completed by the PPD process 230 searching for all multi-paths for all WTRUs in the WTRU set in a round-robin search order. Database maintenance is performed on the search set. Filtering is performed on pilot measurements to ensure high reliability of measurement, e.g., low false alarm probability and high detection probability. Time-diverse accumulation is performed on all candidates to provide performance tolerance to fading. When a potentially strong multi-path is found, it is ensured that the multi-path is verified before announcing availability of the multi-path to the finger assignment algorithm. Pilot set maintenance is performed no faster than once every slot.

The finger assignment is accomplished with a variable number of fingers on a Rake receiver. In order to take advantage of the inherent space-time diversity, the exemplary embodiment of the FDD NBP chipset utilizes a Rake receiver architecture with the ability to assign a variable number of fingers for preferably up to 64 WTRUs. The dynamic assignment and maintenance of received multi-paths to the available Rake receiver fingers is called finger assignment.

According to the present invention, finger assignment is accomplished by estimation of the received multi-path strength and phase for all pilot signals in the WTRU set, followed by a decision to identify the best multi-paths for optimal detection. The WTRU set may contain a record of preferably up to 64 WTRUs and preferably up to 6 antennas in the exemplary embodiment of the invention. Finger assignment is essentially a received multi-path database maintenance task. Before any assignment may take place, the multi-paths must be acquired, resolved and then categorized. The process of acquiring multi-paths is a serial search process based upon performing a search on pilots in the WTRU set as already described for the process 200. The updated Rake finger assignment database is scanned to determine the best multi-paths to assign to the Rake receiver fingers. If any of the multi-paths are different from the ones already assigned, then an assignment is carried out for the new multi-paths.

In the above classification of finger assignment, the database management is selected from any signal processing deemed to provide data that leads to the finger assignment. Such data is then applied to provide optimal finger assignment. The best multi-paths detected by the path searcher are assigned to the available fingers to enable optimum demodulator performance. It is ensured that the pilot multi-path measurements are reliable by filtering and verifying multi-paths before assignment, e.g., low false alarm probability, high detection probability, and elimination of transient multi-paths from being assigned to a Rake receiver. The assignment and removal of multi-paths from the Rake receiver is managed such that finger assignments are not carried out faster than once every frame.

The path search scheduler 205 is used to schedule the WTRU antenna and code search list for the PS to measure. As a WTRU moves around the strength and phase of individual multi-path signals received at the BS may change depending upon the position of the WTRU. The information on which the BS makes the decisions about finger assignment is based upon pilot strength measurements for each WTRU.

Due to changing channel conditions, an individual pilot strength measurement made at a given instant in time is unreliable on its own. The signal may have suffered a fade during the measurement time or it may be over shadowed by noise and hence may not be detected or it may be a transient multi-path. Alternatively, a false alarm may propagate through the system. To obtain more reliable measurements, it is necessary to take into account the results of several measurements made over a period of time longer than the expected Doppler fade. The time between measurements should also be such that statistically the samples are independent taking into consideration the channel conditions. This enables measurements to be made with low false alarm probability and high detection probability.

The PS serially searches for multi-paths for given pilots in the WTRU set. The searcher results are then processed at an average rate of once per slot by the MCU with the further restriction that all the searcher results produced within one frame are preferably processed within one frame. The search order is established based on a predefined algorithm and is capable of taking into account higher-layer information about WTRU priorities, searching faster for higher-priority WTRUs.

The MCU will program the search order in the shared memory and the path searcher will continually search the search list in a round robin manner unless the list is modified by the MCU due to a modified WTRU set or to change the search order. Hence the overhead in maintaining the search list is incremental based upon reflecting changes in the search order or WTRU set content.

Database management for the pilot strength measurements is implemented by categorizing and processing scanned pilot multi-path signals. For each pilot, based on the relative pseudo noise (PN) phase of the received multi-path signals, bins are created. Categorization is the process of grouping similar multi-paths into the same bin and assignment of new multi-paths to a new bin. The bins form the Rake finger assignment database.

In the Rake finger assignment database, the multi-paths are categorized into two groups: a verified group and an unverified group. The verified and unverified multi-paths are used to update the Rake finger assignment database. The verified group identifies the set of pilot multi-paths, which have been detected more than once and hence the probability that the multi-path is a false alarm is low. This group is used for finger assignment. The unverified group identifies the set of pilot multi-paths that have not been detected more than once. This group identifies potential pilot multi-paths where it is indeterminate as to whether the multi-path is a false alarm or a new strong multi-path. For each multi-path signal within this group, a significant probability that the multi-path is a false alarm is presumed as well as a presumption that there is a significant probability that the multi-path is a new strong multi-path.

In the Rake finger assignment database, the verified multi-paths are further categorized into two subgroups: an assigned subgroup and an unassigned subgroup. The unassigned subgroup is the set of multi-paths not assigned to a finger. The assigned subgroup is the multi-path subset that has been assigned to the Rake receiver fingers. As a result, the multi-paths in the assigned subgroup receive their update data directly from the Rake receiver fingers. Since the data from the Rake receiver finger is available more frequently and at a higher reliability (from a locked signal continually being tracked), the assigned subgroup data will be a better estimate of the average multi-path signal strength and relative-phase.

FIG. 3 shows an exemplary configuration of a Rake finger assignment database 300 for categorizing and processing scanned pilot multi-paths in accordance with one embodiment of the present invention. A database entry associated with each multi-path signal is placed in a respective one of a plurality of bins $305_1$-$305_N$ having a data structure that contains a pilot phase data field 310, an antenna data field 315, a code data field 320, an averaged signal strength data field 325, an ASSIGNED flag data field 330, a verification (VERIFIED) flag data field 335, an UPDATE flag data field 340, an assigned Rake finger number (ARFN) data field 345 and an assignment time counter (ATC) data field 350.

In the Rake finger assignment database 300, the pilot phase data field 310, antenna data field 315 and code data field 320 help to uniquely identify each multi-path. The contents of the averaged signal strength data field 325 is a metric used for finger assignment decision-making. The contents of the verification flag data field 335 indicate whether a multi-path has been detected more than once (verified through diversity detection), and the contents of the ASSIGNED flag data field 330 indicate whether a multi-path has already been assigned to a Rake receiver finger. The contents of the UPDATE flag data field 340 indicate that the data for a WTRU has been updated following the last inspection of the database 300 by the finger assignment process.

In the following, $\phi_d$ represents the multi-path relative phase and $S_d$ represents the signal strength for entries in the pilot phase and average signal strength data fields 310, 325 of the database 300.

Once each measurement interval, when the PS 105 passes the results of the scanned WTRU list, for each candidate multi-path, the list is searched for the existence of a similar multi-path in the Rake finger assignment database 300. If the candidate multi-path does not exist, it is added to the database 300 and the verification flag data field 335 is set to unverified. The multi-path's relative phase, (pd, is updated in the database 300 in the respective pilot phase data field 310, and the average signal-strength, $S_d$, is updated in the database 300 according to the following criteria, if its verification flag data field 335 is set to verified:

$$S_d = \alpha S_d + (1-\alpha) S_r \quad \text{Equation 1}$$

If the path is a member of the assigned group, the signal strength as reported by the Rake finger may be used instead of $S_d$. If the multi-path's verification flag data field 335 is set to unverified, the verification flag data field 335 is then set to verified, and the average signal-strength, $S_d$, is updated in the database 300 according to the following criteria:

$$S_d = \frac{S_d + S_r}{2} \quad \text{Equation 2}$$

where $\phi_r$ and $S_r$ represent the multi-path relative phase and signal strength respectively and $\alpha$ represents a filter time constant.

If the multi-path is a member of the assigned subgroup then the same update criteria as depicted in Equation 1 is applied, except that $\phi_r$ and $S_r$ represent the multi-path relative phase and signal strength information respectively, derived from the Rake finger-tracking loop directly and a represents a filter time constant.

For visited WTRUs whose multi-paths exist in the database 300, but are not part of the current received list, the signal strength is updated as follows:

$$S_d = \alpha S_d \quad \text{Equation 31}$$

Finally, for each multi-path updated, the UPDATE flag is set to "updated".

Since the relative position of multi-paths may change, some multi-paths may merge or diverge from the same point. As a result, once the database 300 has been updated, elements of the database 300 need to be reconciled. If the multi-paths diverge, they will be identified as a new multi-path. Thus, they will be flagged as new paths under the normal operating procedure.

If multi-paths merge, however, it is necessary to call a merge process to combine merging multi-paths into a single multi-path. For two multi-paths to merge the multi-paths must have the same antenna and code combination and the relative phase between them are preferably at most $K_{psm}$ ticks (8 ticks equals one chip). $K_{psm}$ is a programmable parameter. Using the above criteria, at most two multi-paths can be merged together only if they have both been verified. The following procedure is used to update the relative phase and signal strength of two merging multi-paths if both multi-paths have the UPDATE flag set to UPDATED.

$$\varphi_d = \frac{\varphi_d(1) + \varphi_d(2)}{2} \quad \text{Equation 4}$$

and $$S_d = \frac{S_d(1) + S_d(2)}{2} \quad \text{Equation 5}$$

where $S_d(j)$ and $\phi_d(j)$ for j=1, 2 represent the merging multi-paths' signal strength and relative phase, respectively. As a last step, all of the multipaths in the database have their updated signal strength checked against a noise-floor threshold (NF). Those multipaths whose signal strength falls below this threshold are removed from the database 300. This process of removing the multipaths is critical in controlling the size of the database and therefore in controlling the amount of memory and microprocessor cycles allocated to database storage and database processing. If an ASSIGNED multipath is removed from the database then the finger assigned to this multipath is immediately unassigned and freed up.

Special "fat" paths which incorporate several multi-paths may be used, whereby the path position is a range of code phases as opposed to a single value. The path signal phase is computed by assigning a set of signal strength measurements $\{S_i\}$ available for the fat path such that the phases at which the measurements are taken are exactly one chip away from each other and are all within the path position range. Then the path signal strength is given by:

$$\sum_i S_i \quad \text{Equation 6}$$

Once a fat path has been identified, the finger assignment algorithm is used to make a decision regarding whether resources should be allocated to the reception of this path. The criteria for this decision are to be determined. If a decision is made to receive the fat path, then Rake receiver fingers are assigned to the fat path as follows. A set of Rake fingers is selected and assigned to the fat path at one-chip intervals away from each other. The number of Rake receiver fingers assigned should be sufficiently large to cover the path position range. The code-tracking loop in the fingers is disabled, whereby the fingers cannot change their position.

The finger assignment decisions and finger re-assignment decisions are made at frame rate. The finger assignment objective is to assign the many multi-paths available to the fingers in an optimal fashion. At least one finger is assigned to each WTRU and the remaining multi-paths are optimally assigned to the other fingers by balancing the aggregate power between the WTRUs. Note that the strongest multi-path for one WTRU may far exceed the aggregate multi-paths for another WTRU.

The initial problem of finger assignment assumes that a certain amount of pre-processing has been performed before being presented with a small list of candidate path locations and associated observed powers. This input is provided on a regular basis and the observed powers are measured only for the duration of a single observation interval.

The finger assignment algorithm is performed based on verified paths. It is presumed that any verified path has sufficient signal strength to warrant a finger assignment should this be possible. The assignment decision-making process uses the following quantities:

$K_{ep}$ is the number of fingers reserved as an "emergency pool." It is desirable to keep a small number of fingers, "emergency pool", which may be used for RACH (random access channel) message reception. $K_T$ is the total number of fingers available. If there are enough fingers available to accommodate all verified multi-paths then the paths are assigned to the fingers. Otherwise finger assignment is implemented as follows:

(1) For each WTRU, all of the verified multi-paths are placed in order from strongest to weakest signal strength.

(2) A finger assignment table of $(K_T - K_{ep})$ entries is created and the strongest multi-path candidate for each WTRU are assigned to one Rake finger.

(3) All currently assigned multi-paths are determined which have been assigned for less than $N_{hyst}$ (programmable value) frames and which have not been considered so far and include these multi-paths in the finger assignment table. Given that the Rake receiver fingers contain an algorithm with initial pull-in times on the order of a frame, it is not desirable to change a multi-path assignment if it was recently assigned. Hence a counter, $N_{hyst}$ is maintained which keeps track of the finger assignment time and provides some hysteresis. At this point, the multi-path strength should be evaluated to ensure that the assignment is correct.

(4) The following process is repeated until all fingers are exhausted:
  (a) Compute the aggregate strength of all multi-paths assigned for each WTRU in the assignment table;
  (b) Find several, preferably two, weakest WTRUs by aggregate strength, weakest is $WTRU_1$ and next weakest is $WTRU_2$ and so on;
  (c) For the unassigned paths of the weakest $WTRU_1$, continue assigning the next strongest multi-path until the aggregate strength exceeds the aggregate strength for $WTRU_2$.

(5) Assign and de-assign fingers according to the new assignment table, ensuring that already assigned fingers are not disturbed.

(6) Update the ASSIGNED flags for all multi-paths to reflect the assigned condition.

Finger pool sizes are a function of system design. Preferably, a total of 384 fingers functions are used, divided into two groups of 192 finger functions each. Any WTRU must have all of its fingers assigned to the same group. Thus, it is preferred to maintain two separate finger management routines, each for approximately the same number of WTRUs, and each with its own emergency pool, etc. While this may require running through the above procedure twice, it may actually simplify the process, since the total number of resources to be managed per pool is smaller by a factor of 2.

The assignment of fingers therefore requires that the received signals be categorized into a verified subgroup and an unverified subgroup. The multi-path signals in the verified subgroup are categorized into assigned and unassigned signals according to whether the respective signals are assigned to a Rake receiver finger, and the assigned signals are directly updated to provide an estimate of an average multi-path signal strength and a relative phase. A finger is then selected for signal processing from the assigned signals. The signals from the WTRUs are ordered from the signal source having the weakest maximum verified received signal within a pool of possible signal sources for reception. A multi-path is assigned for the signal source having the weakest maximum verified received signal. Subsequent to assigning for the signal source having the weakest maximum verified received signal, a multi-path for the signal having the second weakest maximum verified received signal is assigned. The process is continued in a reverse order of the maximum strength of the multi-path signals from each remaining signal sources.

FIGS. 4A and 4B, taken together, are a flowchart of the Rake receiver finger pool and path search process 400 implemented in accordance with the present invention. In step 405, the Rake finger assignment database 300 is established. In step 410, multi-path signals are categorized in the database 300 into verified and unverified groups. In step 415, the multi-path signals in the verified group are categorized into assigned and unassigned subgroups. In the database 300, each multi-path list, passed by the PS 105 during the occurrence of a measurement interval (step 420), is searched for the existence of a similar multi-path in the database 300 (steps 425, 430). If the multi-path is not found in the database 300, it is added to a bin in the database 300 (step 435) and the bin's verification flag data field 335 is set to unverified (step 440). If the multi-path is found in the database 300, a determination of whether it is a member of the assigned or unassigned subgroup is made by checking the bin's ASSIGNED flag data field 330 (step 445). If the multi-path is not a member of the assigned subgroup and its verification flag data field 335 is set to verified, the relative phase, $\phi_d$, and the multi-path's average signal-strength, $S_d$, are updated according to Equations 1 and 2 (step 450) and its UPDATE flag data field 340 is set to updated (step 455). If the multi-path's verification flag data field 335 is set to unverified, the verification flag data field 335 is set to verified (465) and the relative phase, $\phi_d$ and the multi-path's average signal-strength, $S_d$, are updated according to Equations 3 and 4 (step 470) and its UPDATE flag data field 340 is set to updated (step 475).

FIG. 5 is a flow chart of a process 500 including method steps used to control the size of the database 300. In step 505, the updated signal strength of each of the multipaths in the database 300 are compared to a predetermined noise-floor threshold (NF). If, in step 510, it is determined that a multi-path has a signal strength which falls below the predetermined NF threshold, the multipath is removed from the database 300 (step 515). This process of removing the multipaths is critical in controlling the size of the database and therefore in controlling the amount of memory and microprocessor cycles allocated to database storage and database processing. If the removed multipath was an ASSIGNED multipath, the finger assigned to this multipath is immediately unassigned and freed up (step 520).

To address problems of path search and finger management in a receiver using the inventive path search and finger assignment approach for the FDD mode of an UMTS Node B, what is termed as a sequential ratio test (SRT) may be utilized. To do so, it is sufficient to abstract away much of the receiver functionality. The treatment of the SRT is generally based on the publication "Discrete Stochastic Processes", by R. G. Gallager, Kluwer Academic Publishers, 1996, Boston, Mass. The introduction of a longer-term "memory" into the continuous multi-path power observation processes is one of the tasks accomplished by the SRT.

The present invention is envisaged to be applicable to systems including ARIB (Association of Radio Industries and Business), UMTS (Universal Mobile Telecommunications System), CDMA (code division multiple access) and CDMA 2000. While the present invention has been particularly shown and described with reference to preferred embodiments, it will be understood by those skilled in the art that various changes in form and details may be made. Although the preferred embodiments are described in conjunction with a W-CDMA system such as used in the third generation partnership program (3GPP) utilizing the FDD mode, the embodiments are applicable to any hybrid code division multiple access (CDMA)/time division multiple access (TDMA) communication system. Additionally, some embodiments are applicable to CDMA systems, in general, using beam forming, such as the proposed time division duplex (TDD) mode of 3GPP W-CDMA. For example, even though the preferred embodiment is described in the context of layer 1 in a TDD scenario, the present invention has applicability to ARIB, UMTS and CDMA as well as CDMA 2000.

While this invention has been particularly shown and described with reference to preferred embodiments, it will be understood by those skilled in the art that various changes in form and details may be made therein without departing from the scope of the invention described hereinabove.

What is claimed is:

1. A wireless communication apparatus for assigning multi-paths to Rake receiver fingers, the apparatus comprising:
   a processor which includes a path search scheduler for receiving signals from higher layers and generating scheduling data;
   a memory device in communication with the processor, wherein the memory device has a first portion for receiving the scheduling data and storing the results of a pilot path search process performed by the path search scheduler, and a second portion for storing the results of a pilot strength measurement (PSM) process running on the processor, wherein the processor implements a path position detection process and a finger assignment process for providing an assignment to a Rake finger pool, the path position detection process searching for all multi-paths for a plurality of wireless transmit/receive units (WTRUs) in a round-robin search order; and
   a path search vector correlator (VC) grid for receiving data from the first portion of the memory device and providing an output which is evaluated by the PSM process to generate evaluation results which are stored in the second portion of the memory device for access by the path position detection process.

2. The wireless communication apparatus of claim 1 wherein the apparatus is further configured to assign multi-paths to Rake receiver fingers by establishing a Rake finger assignment database.

3. The wireless communication apparatus of claim 2 wherein a plurality of multi-path signals are categorized in the database into a verified group and an unverified group, wherein the verified group includes multi-path signals that have been detected more than once, and the unverified group includes multi-path signals that have not been detected more than once.

4. The wireless communication apparatus of claim 3 wherein the multi-path signals are categorized in the verified group into an assigned subgroup and an unassigned subgroup, each of the multi-path signals in the assigned subgroup is assigned to a Rake receiver finger and each of the multi-path signals in the unassigned subgroup is not assigned to a Rake receiver finger, and each multi-path signal is assigned a respective bin in the database, each bin having a data structure that includes a pilot phase data field and a verification flag data field.

5. The wireless communication apparatus of claim 4 wherein, during a measurement interval, a plurality of newly measured multi-path signals are received, each newly measured multi-path signal is compared to the multi-path signals in the database to determine if each newly measured multi-path signal is found in the database and, if a multi-path signal in the database that belongs to the unassigned subgroup matches a newly measured multi-path signal, the verification flag data field is set such that it indicates that the multi-path signal is verified, and the relative phase of the multi-path signal is updated in the pilot phase data field.

6. The wireless communication apparatus of claim 5 wherein the signal strength of each multi-path signal is compared to a predetermined noise floor threshold and, if the signal strength of the multi-path signal is less than the noise floor threshold, the multi-path signal is removed from the database.

7. The wireless communication apparatus of claim 6 wherein if the removed multi-path signal is categorized in the assigned group, the Rake receiver finger is no longer assigned to the removed multi-path signal.

8. The wireless communication apparatus of claim 7 wherein if a newly measured multi-path signal is not found in the database, the newly measured multi-path signal is added to the database.

9. The wireless communication apparatus of claim 3 wherein each multi-path signal is assigned a respective bin in the database, the bin including a data structure including a data field indicating the averaged signal strength of the multi-path signal.

10. The wireless communication apparatus of claim 3 wherein each multi-path signal is assigned a respective bin in the database, the bin including a data structure including a data field identifying an assigned Rake receiver finger.

* * * * *

UNITED STATES PATENT AND TRADEMARK OFFICE
CERTIFICATE OF CORRECTION

PATENT NO. : 7,583,720 B2  Page 1 of 1
APPLICATION NO. : 10/798707
DATED : September 1, 2009
INVENTOR(S) : Reznik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 967 days.

Signed and Sealed this

Fourteenth Day of September, 2010

David J. Kappos
*Director of the United States Patent and Trademark Office*